United States Patent Office 3,462,381
Patented Aug. 19, 1969

3,462,381
POLYMERIC MATERIALS
David Crawford Eaton and Geoffrey Arthur Haggis, Manchester, England, assignors to Imperial Chemical Industries Limited, London, England, a corporation of Great Britain
No Drawing. Filed Oct. 20, 1966, Ser. No. 587,960
Claims priority, application Great Britain, Oct. 27, 1965, 45,502/65
Int. Cl. C08g 22/44, 22/16
U.S. Cl. 260—2.5         6 Claims

ABSTRACT OF THE DISCLOSURE

A process for the manufacture of polyurethane foams which includes reacting an aliphatic polyisocyanate with a polyether polyol in the presence of a gas-generating agent and from 1% to 30%, based on the weight of the polyether polyol, of a compound of the formula

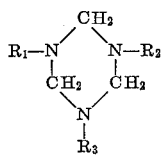

wherein $R_1$, $R_2$ and $R_3$, which may be the same or different, represent alkyl, hydroxyalkyl or dihydroxyalkyl groups, each of said groups containing at most four carbon atoms.

---

This invention relates to polymeric materials and more particularly to polyurethane foams and a process for their manufacture.

The manufacture of polyurethane foams by the reaction of an organic polyisocyanate with a polyether polyol in the presence of a gas-generating agent is well-known. In the commercial production of polyurethane foams from polyether polyols the most frequently used polyisocyanate is tolylene diisocyanate but other aromatic polyisocyanates such as diphenylmethane diisocyanate are also used. Formulations based upon these aromatic polyisocyanates provide foams which, because of their desirable physical properties, are used for a wide variety of purposes. Even when prepared from aromatic polyisocyanates of extremely high purity, however, these foams show a marked tendency to discolour. Thus a foam which is initially white becomes yellow in a relatively short time and may eventually become orange or brown. Pigmented foams show corresponding changes in colour. Attempts to alleviate this situation by the incorporation of additives in the foam-forming reaction mixture have met with little success.

It is known that polyurethanes prepared from aliphatic polyisocyanates have a much smaller tendency to discolour. Attempts to prepare foams from aliphatic polyisocyanates have, however, met with little success, possibly because of their much lower reactivity in comparison witth aromatic polyisocyanates. Previously it has generally been necessary to resort to a two-stage prepolymer process to obtain polyurethane foams from aliphatic isocyanates. It has now been found that polyurethane foams may be successfully prepared by a one-stage process from aliphatic polyisocyanates and polyether polyols when there is included in the reaction mixture a substituted triazine compound of the type hereinafter described.

Thus, according to the present invention, there is provided a process for the manufacture of polyurethane foams which comprises reacting an aliphatic polyisocyanate with a polyether polyol in the presence of a gas-generating agent and a compound of the formula

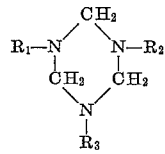

wherein $R_1$, $R_2$ and $R_3$, which may be the same or different, represent alkyl, hydroxyalkyl or dihydroxyalkyl groups, each of said groups containing not more than four carbon atoms.

Suitable compounds may be prepared by reacting an aliphatic primary amine with formaldehyde. Mixtures of primary amines may be used, for example, mixtures of amines which do and which do not contain hydroxyl groups. Preferred compounds for use in the process of the present invention are compounds containing at least three hydroxyl groups in the molecule such as may be prepared by the condensation of formaldehyde with a mono-alkanolamine.

Examples of suitable compounds include 1,3,5-tris-β-hydroxyethyl hexahydro-s-triazine, 1,3,5-tris-β and γ-hydroxypropyl hexahydro-s-triazine, 1,3-bis-β-hydroxyethyl-5-methyl hexahydro-s-triazine and 1,3,5-trimethyl hexahydro-s-triazine. Mixtures of such compounds may be used if desired. Where a compound or mixture of compounds has a hydroxy functionality of less than two it is desirable to include an alkanolamine such as triethanolamine in the reaction mixture.

The most suitable amount of substituted triazine compound to be included in the reaction mixture is usually from 1% to 30% and preferably from 2% to 10% based on the weight of the polyether polyol.

Aliphatic polyisocyanates which may be used in the process of the present invention are compounds containing in the molecule at least two isocyanate groups attached to aliphatic carbon atoms. Examples of suitable polyisocyanates include tetramethylene diisocyanate, hexamethylene diisocyanate, nonamethylene diisocyanate, cyclohexyl diisocyanate, methylcyclohexyl diisocyanate, bis-(4-isocyanatocyclohexyl)methane, m-, or p-xylylene diisocyanate, bis-(2-isocyanatoethyl)carbonate and bis-(2-isocyanatoethyl)fumarate. Reaction products of an excess of such polyisocyanates with polyhydric alcohols such as trimethylolpropane may be used if desired. Mixtures of aliphatic polyisocyanates may be used.

As examples of polyether polyols for use in the process of the present invention there may be mentioned hydroxyl-ended polymers and co-polymers of cyclic oxides, for example ethylene oxide, 1,2-propylene oxide, 1,2-butylene oxide and 2,3-butylene oxide, oxacyclobutane and substituted oxacyclobutanes and tetrahydrofuran. Such polyethers may be linear polyether glycols as are prepared for example by the polymerisation of one or more alkylene oxides in the presence of a basic catalyst such as potassium hydroxide and a glycol or a primary monoamine. Alternatively, there may be used branched polyether polyols prepared for example by the polymerisation of one or more alkylene oxides in the presence of a basic catalyst and a substance having more than two active hydrogen atoms per molecule, for example ammonia, hydrazine and polyhydroxy compounds such as glycerol trimethylolpropane and other hexanetriols, trimethylolethane, triethanolamine, pentaerythritol, sorbitol, sucrose and phenol formaldehyde reaction products, aminoalcohols such as monoethanolamine and diethanolamine, and polyamines such as ethylene diamine, tolylene diamine and diaminodiphenylmethane. Branched polyethers may also be produced by copolymerising a cyclic oxide of the type already mentioned with cyclic oxides having a functionality greater than two, for example diepoxides, glycidol and 3-hydroxymethyloxacyclobutane.

Particularly suitable polyether polyols are the reaction products of propylene oxide with compounds containing two or more active hydrogen atoms per molecule and also the products obtained by further reacting such polyethers with ethylene oxide.

The polyether polyols normally have molecular weights of from 200 to 8000. Mixtures of linear and branched polyether polyols may be used if desired.

The gas-generating agent to be used in the process of the present invention may be water or it may be an inert liquid of low boiling point which vaporises under the influence of the exothermic polyurethane-forming reaction. It is often advantageous to use both types of gas-generating agent in conjunction with one another.

Water is usually employed in amounts of from 1% to 10% by weight of the polyether polyol when used as a gas-generating agent.

Suitable low boiling point liquids are liquids that are inert towards the polyurethane foam-forming ingredients and have boiling points not exceeding 75° C. at atmospheric pressure and preferably between —40° and 50° C. Examples of such liquids are halogenated hydrocarbons such as methylene chloride, vinylidene chloride, trichlorofluoromethane, dichlorodifluoromethane, dichloromonofluoromethane, monochlorodifluoromethane, dichlorotetrafluoroethane, 1,1,2 - trichloro - 1,2,2-trifluoroethane, dibromodifluoromethane and monobromotrifluoroethane. Mixtures of these low boiling point liquids one with another and/or with other substituted or unsubstituted hydrocarbons may also be used. Such liquids are usually employed in amounts of from 1% to 100% preferably 5% to 50% by weight of the polyether polyol.

Although the substituted triazine compound exerts a catalytic effect on the foam-forming reaction there may, if desired, also be included in the reaction mixture another catalyst. Suitable catalysts for polyurethane foam formation are well-known in the art and include in particular tertiary amines. Examples of suitable tertiary amines include triethylamine, dimethylethylamine, dimethylethanolamine, dimethylbenzylamine, dimethylcyclohexylamine, dimethylphenylethylamine, 1,1' - dimethyl-4,4'-bipiperidyl, tetramethyl - 1,3-butanediamine, triethylene diamine, N-alkylmorpholines, N-alkylpyrrolidines, N-alkylpiperidines, pyrrolizidine, β-dimethylaminopropionamide and fully N-substituted 4-aminopyridines such as 4-dimethylaminopyridine. Amine salts such as dimethylbenzylamine lactate are also suitable. Other suitable catalysts include non-basic organic compounds of metals, for example dibutyltin dilaurate, iron acetylacetonate, dibutyltin diacetate, manganese acetylacetonate, stannous carboxylates such as stannous octoate and lead carboxylates such as lead acetate and lead octoate. Mixtures of catalysts are often particularly advantageous.

The process of the present invention may be performed using any of the general methods described in the prior art for the production of foamed polyurethanes. Thus the foam-forming ingredients may be mixed continuously or discontinuously and the reaction mixture may include, in addition to the materials already described, other conventional additives. These may include surface-active agents, for example oxyethylated fatty alkyl phenols, oxyethylated fatty alcohols, salts of sulphuric acid derivatives of high molecular weight organic compounds and particularly alkyl and aryl polysiloxanes and copolymers thereof with alkylene oxides, foam-stabilising agents, for example ethyl cellulose, colouring matters, plasticisers, antioxidants and flame-retardants such as tris-2-chloroethyl phosphate and tris-2,3-dibromopropyl phosphate.

The foams produced according to the process of the present invention show excellent resistance to discoloration especially under the influence of light and oxides of nitrogen.

The invention is illustrated but not limited by the following examples in which all parts are by weight:

Example 1

To 100 parts of an oxypropylated glycerol of molecular weight approximately 3000 and hydroxyl value 56 mg. KOH/g. are added 5 parts of 1,3,5-tris(β-hydroxyethyl)hexahydro-s-triazine. To this mixture is then added with stirring 45 parts of hexamethylene diisocyanate, 4.5 parts of a solution comprising 3.5 parts of water and 1.0 part of a siloxane-oxyalkylene copolymer, 0.2 part of tetramethylguanidine and 2 parts of stannous octoate. The stirred mixture is poured into a mould and a foam forms which cures rapidly on the surface to give a resilient cellular product having low density, good structure and excellent resistance to discoloration by light and oxides of nitrogen.

Similar results are obtained if the tetramethyl-guanidine above is replaced by an equal amount of triethylene diamine, 1,1'-dimethyl-4,4'-bipiperidyl or β-dimethylaminoethanol.

Example 2

To 100 parts of an oxyethylated oxypropylated glycerol of molecular weight approximately 3700, hydroxyl value 47 mg. KOH/g. and containing approximately 66% of primary hydroxyl groups are added 5 parts of 1,3,5-tris (β-hydroxypropyl)-hexahydro-s-triazine monohydrate. To this mixture is then added with stirring 43 parts of hexamethylene diisocyanate, 4.5 parts of a solution comprising 3.5 parts of water and 1.0 part of a siloxane-oxyalkylene copolymer, 0.2 part of tetramethylguanidine and 2.0 parts of stannous octoate. The stirred mixture is poured into a mould and a foam forms which cures rapidly on the surface to give a resilient cellular product of low density and outstanding resistance to discoloration by light and oxides of nitrogen.

Example 3

To 100 parts of an oxypropylated glycerol of molecular weight approximately 3000 and hydroxyl value 56 mg. KOH/g. are added 4 parts of 1,3,5-trimethylhexahydro-s-triazine and 4 parts of triethanolamine. To this mixture is then added with stirring 46 parts of hexamethylene diisocyanate, 4.5 parts of a solution comprising 3.5 parts of water and 1 part of a siloxane-oxyalkylene copolymer, 0.2 part of tetramethylguanidine and 2 parts of stannous octoate. The stirred mixture is poured into a mould and a foam forms which cures to give a resilient cellular product of low density, good structure and excellent resistance to discoloration by light and oxides of nitrogen.

Example 4

To 100 parts of an oxyethylated oxypropylated glycerol of molecular weight approximately 3700, hydroxyl value 47 mg. KOH/g. and containing approximately 66% of primary hydroxyl groups are added 5 parts of a composition whose constitution corresponds to 1,3-bis(β-hydroxyethyl)-5-methylhexahydro-s-triazine obtained by reacting 2 molecules of monoethanol amine and 1 molecule of monomethylamine with 3 molecules of formaldehyde. To this mixture is then added with stirring 40 parts of hexamethylene diisocyanate, 4.5 parts of a solution comprising 3.5 parts of water and 1.0 part of siloxane-oxyalkylene copolymer, 0.2 part of tetramethylguanidine and 1.5 parts of stannous octoate. The stirred mixture is poured into a mould and a foam forms which cures to give a resilient product of good structure, low density and excellent resistance to discoloration by light and oxides of nitrogen.

Example 5

To a mixture of 100 parts of an oxypropylated glycerol of molecular weight approximately 3000 and hydroxyl value 56 mg. KOH/g., 18 parts of trichlorofluoromethane and 15 parts of 1,3,5-tris(β-hydroxyethyl) hexahydro-s-triazine are added with stirring 2 parts of a solution comprising 1.0 part of water and 1.0 part of a siloxane-oxyalkylene copolymer, 0.2 part of tetramethylguanidine, 2.0 parts of stannous octoate and 35 parts of hexamethylene diisocyanate. The stirred mixture is poured into a mould and a foam forms which cures to give a resilient cellular product displaying excellent resistance to discoloration by light and oxides of nitrogen.

Example 6

To 100 parts of an oxyethylated oxypropylated glycerol of molecular weight approximately 3700, hydroxyl value, 47 mg. KOH/g. and containing approximately 66% of primary hydroxyl groups are added 10 parts of 1,3,5-tris (β-hydroxyethyl)-hexahydro-s-triazine. To this mixture is then added with stirring 73 parts of dodecamethylene diisocyanate, 4.5 parts of a solution comprising 3.5 parts of water and 1.0 part of a siloxane-oxyalkylene copolymer, 0.2 part of tetramethylguanidine and 2.0 parts of stannous octoate. The stirred mixture is poured into a mould and a foam forms which cures to give a resilient product of good structure and excellent resistance to discoloration by light and oxides of nitrogen.

Example 7

To a mixture of 100 parts of oxypropylated glycerol of molecular weight approximately 3000 and hydroxyl value 56 mg. KOH/g., 10 parts of 1,3,5-tris(β-hydroxyethyl) hexahydro-s-triazine and 20 parts of trichlorofluoromethane are added with stirring 2 parts of a solution comprising 1.0 part of water and 1.0 part of siloxane-oxyalkylene copolymer, 43.6 parts of dodecamethylene diisocyanate, 0.2 part of tetramethylguanidine and 2.0 parts of stannous octoate. The stirred mixture is poured into a mould and a foam forms which cures to give a resilient cellular product displaying excellent resistance to discoloration by light and oxides of nitrogen.

Example 8

To a mixture of 20 parts of an oxypropylated trimethylolpropane of molecular weight approximately 320 and hydroxyl value 520 mg. KOH/g., 6 parts of 1,3,5-tris (β-hydroxyethyl)hexahydro-s-triazine and 6 parts of trichlorofluoromethane are added with stirring 0.3 part of a siloxane-oxyalkylene copolymer, 0.5 part of water, 40 parts of bis(4-isocyanatocyclohexyl) methane and 0.1 part of tetramethylguanidine. The stirred mixture is poured into a mould and a foam forms which cures to give a rigid product of good structure and low density.

Example 9

To a mixture of 20 parts of oxypropylated triethanolamine of molecular weight approximately 320 and hydroxyl value 530 mg. KOH/g., 4 parts of 1,3,5-tris(β-hydroxyethyl)-hexahydro-s-triazine and 6 parts of trichlorofluoromethane are added with stirring 0.5 part of a siloxane-oxyalkylene copolymer and 20 parts of m-xylylene diisocyanate. The stirred mixture is poured into a mould and a foam forms which cures to give a semi-rigid product of low density.

Example 10

To a mixture of 20 parts of oxypropylated triethanolamine of molecular weight approximately 320 and hydroxyl value 530 mg. KOH/g., 4 parts of 1,3,5-tris(β-hydroxyethyl)-hexahydro-s-triazine and 6 parts of trichlorofluoromethane are added with stirring 0.5 part of a siloxane-oxyalkylene copolymer, 1.0 part of a block copolymer of propylene oxide and ethylene oxide of molecular weight approximately 2000, 18 parts of cyclohexylene 1,4-diisocyanate and 0.05 part of stannous octoate. The stirred mixture is poured into a mould and a foam forms which cures to give a semi-rigid cellular product.

Example 11

To a mixture of 20 parts of oxypropylated sorbitol of molecular weight approximately 685 and hydroxyl value 490 mg. KOH/g., 2 parts of 1,3,5-tris(β-hydroxyethyl)-hexahydro-s-triazine and 6 parts of trichlorofluoromethane are added with stirring 0.5 part of a siloxane-oxyalkylene copolymer, 1.0 part of a block copolymer of propylene oxide and ethylene oxide of molecular weight approximately 2000, 19 parts of m-xylylene diisocyanate and 0.25 part of stannous octoate. The stirred mixture is poured into a mould and a foam forms which cures rapidly to give a rigid product.

Example 12

To 100 parts of an oxypropylated glycerol of molecular weight approximately 3400 and hydroxyl value 49 mg. KOH/g. and containing approximately 33% of primary hydroxyl groups are added 5 parts of 1,3,5-tris(β-hydroxyethyl)hexahydro-s-triazine. To this mixture is then added with stirring 4.5 parts of a solution comprising 3.5 parts of water and 1.0 part of a siloxane-oxyalkylene copolymer, 0.2 part of triethylene diamine and 53 parts of bis (β - isocyanatoethyl)carbonate. The stirred mixture is poured into a mould and a foam forms which cures rapidly to give a resilient product of low density and excellent resistance to discoloration by light and oxides of nitrogen.

We claim:

1. A process for the manufacture of polyurethane foams which comprises reacting an aliphatic polyisocyanate with a polyether polyol in the presence of a gas-generating agent and from 1% to 30%, based on the weight of the polyether polyol, of a compound of the formula:

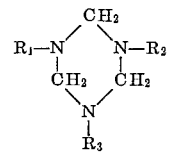

wherein $R_1$, $R_2$ and $R_3$, which may be the same or different, represent hydroxyalkyl or dihydroxyalkyl groups, each of said groups containing at most four carbon atoms.

2. A process as claimed in claim 1 wherein the said compound contains at least three hydroxyl groups in the molecule.

3. A process as claimed in claim 2 wherein the compound is 1,3,5-tris-β-hydroxyethyl hexahydro-s-triazine.

4. A process as claimed in claim 1 wherein the said compound has a hydroxyl functionality of less than two and is used together with an alkanolamine.

5. A process as claimed in claim 1 wherein the said compound is used in an amount of from 2% to 10% based on the weight of the polyether polyol.

6. A process as claimed in claim 1 wherein the polyether polyol is a reaction product of propylene oxide with a compound containing at least two active hydrogen atoms per molecule or a product obtained by reacting such a polyether with ethylene oxide.

References Cited

UNITED STATES PATENTS

| | | | |
|---|---|---|---|
| 2,944,998 | 7/1960 | Buxbaum | 260—45.8 |
| 2,949,431 | 8/1960 | Britain | 260—2.5 |
| 3,155,625 | 11/1964 | Long et al. | 252—182 |
| 3,281,378 | 10/1966 | Garber et al. | 260—2.5 |
| 3,351,650 | 11/1967 | Cross et al. | 260—453 |

DONALD E. CZAJA, Primary Examiner

MICHAEL B. FEIN, Assistant Examiner

U.S. Cl. X.R.

260—77.5, 248